United States Patent
Effenberger (10) Patent No.: US 6,851,944 B2
(45) Date of Patent: Feb. 8, 2005

(54) MOLD TOOL CLAMPING DEVICE FOR BLOW MOLD MACHINES

(75) Inventor: Alfred Effenberger, Filderstadt (DE)

(73) Assignee: Hesta-Graham GmbH & Co KG (DE)

( * ) Notice: Subject to any disclaimer, the term of this patent is extended or adjusted under 35 U.S.C. 154(b) by 180 days.

(21) Appl. No.: 10/280,912

(22) Filed: Oct. 25, 2002

(65) Prior Publication Data

US 2003/0082262 A1 May 1, 2003

(30) Foreign Application Priority Data

Oct. 25, 2001 (DE) .......................................... 101 52 050

(51) Int. Cl.[7] .......................... B29C 49/48; B29C 49/56
(52) U.S. Cl. ...................................... 425/195; 425/541
(58) Field of Search .............................. 425/541, 182, 425/192 R, 195, 595

(56) References Cited

U.S. PATENT DOCUMENTS

| | | | | |
|---|---|---|---|---|
| 4,484,880 A | * | 11/1984 | Schwarz | 425/192 R |
| 4,500,275 A | * | 2/1985 | Ruhl | 425/192 R |
| 4,655,275 A | * | 4/1987 | Worner | 425/195 |
| 4,684,101 A | * | 8/1987 | Wagner et al. | 425/192 R |
| 4,842,506 A | * | 6/1989 | Coutier | 425/451.9 |
| 5,078,586 A | * | 1/1992 | Holzschuh | 425/192 R |
| 5,206,038 A | * | 4/1993 | Yonezawa | 425/192 R |
| 5,486,101 A | * | 1/1996 | Guyon | 425/192 R |

* cited by examiner

*Primary Examiner*—Robert B. Davis
(74) *Attorney, Agent, or Firm*—Pendorf & Cutliff (57) ABSTRACT

A mold tool clamping device (30) for a blow mold comprising two mold halves (13 and 13). For fixing of the rear blow mold half to the clamp plate associated therewith, there is provided at least two wedge locks or cam locks, which are provided in a symmetric arrangement relative to the "vertical" transverse central plane of the rear mold tool, which are clampable with wedges, which, supported on the back side of the clamp plate, transverse to the longitudinal axis of the clamp bolts, are drivable into their anchor groove of anchor keyways, wherein these wedge locks are so arranged, that the wedges are drivable "from the side" into their clamp position in designed "grooves" of the clamp bolts complimentary thereto. This makes possible a rapid and positionally accurate securing of the rear mold half to its rear clamp plate.

12 Claims, 5 Drawing Sheets

MOLD TOOL CLAMPING DEVICE FOR BLOW MOLD MACHINES

BACKGROUND OF THE INVENTION

1. Field of the Invention

The invention concerns a mold tool or segment clamping device for blow mold machines, in which a blow mold comprising two mold halves—mold tools—, which can be pushed together via a closure driver or actuator, in such a manner, that in the closed configuration of the blow mold they lie directly against each other along a central plane and are again separable from each other "symmetric to this central plane", wherein as the closure actuator an electric or hydraulic linear actuator is provided, which engages on the "back" side of the clamp plate facing the drive and the further aggregates of the machine carrying machine frame, which clamp plate is synchronized via a synchronization drive with the "front" clamp plate on which the "front" mold tool is tightly clamped, is synchronized, the synchronization being in such a manner, that both mold halves are displaceable by a defined stroke relative to the blow mold central plane, and wherein for fixing the mold halves on their clamp plates these are provided with clamping bolts traversing these and connected resistant against pulling with the mold halves, which have anchoring end segments projecting or exiting from the clamp plates, which are engaged by the clamp elements, which respectively maintain the mold halves releasably fixed to the clamp plates which carry them.

2. Description of the Related Art

In the known blow mold machines of this type the blow mold halves are first secured to the front clamp plate in the closed configuration of the blow mold and then brought into that arrangement, in which the rear blow mold half is secured to the rear clamp plate—in the closed system. The securing occurs conventionally by anchor screws supported on the back side of the rear clamp plate, which are screwed onto clamp bolts which extend through the rear clamp plate, which are secured to the rear blow mold half. Alternatively, screws supported on the back side of the rear clamp plate are employed, which engage in threads in the rear blow mold half.

This type of securing is frequently tedious, since the intermediate space between the rear clamp plate and machine frame is difficult to access, so that the positionally accurate fixing of the rear blow mold half to its clamp plate is difficult and time consuming.

SUMMARY OF THE INVENTION

It is thus the task of the invention, to provide a tool clamping device, which makes possible a rapid and positionally accurate securing of the rear mold half to its rear clamp plate.

According thereto there is provided, for fixing of the rear blow mold half to the clamp plate associated therewith, at least two wedge locks or cam locks, which are provided in a symmetric arrangement relative to the "vertical" transverse central plane of the rear mold tool, which are clampable with wedges, which, supported on the back side of the clamp plate, transverse to the longitudinal axis of the clamp bolts, are drivable into their anchor groove or anchor keyways, wherein these wedge locks are so arranged, that the wedges are drivable "from the side" into their clamp position in designed "grooves" of the clamp bolts complimentary thereto.

In a preferred design of the clamping device the wedge lock pair supported on the clamp plate for fixing the mold halves is so designed that both wedges are operable "one handed" from one side of the clamp plate, whereby the fixing of the mold halves is simplified and the time required for the assembly is reduced.

A "collective" operation of both wedge locks of this type is realized in a preferred embodiment by means of a threaded spindle, wherein as a linear actuator for the displacement of the tensioning wedges of a wedge lock pair, a manual or motor driven spindle drive is provided, of which the rotationally actuatable threaded spindle has counter rotating threaded segments, which are in threaded engagement with appropriately counter rotating threads provided in glide stones rigidly connected with the wedges of the wedge blocks, which guide stones are mounted slidably relative to the clamp plates or in guide elements rigidly connected to the clamp plates.

In a preferred design of the wedge locks, these are so designed that the spindle threads are self-jamming, the wedge angle of the wedges however lies "outside" of the self-jamming amount. Thereby, the manipulation of the wedge locks is facilitated, which are tensionable and again releasable without significant expenditure of force, "by hand".

By the design of the clamping bolt side wedge lock element as a T-groove, in which the groove wall, on which the wedge with its slant surface is supportable, is for its part running at the wedge angle, the slide block of the wedge however projects "axially" out between these groove walls through the central groove slit, is in combination with a perpendicular to the central axis of the clamping bolt running guide abutment, which supports itself on the plate or as the case may be a "parallel" guide block seated thereon, achieved, that in each engagement position of the wedge with the clamp bolts, pull or draw forces can be balanced or compensated for, without occurrence of a tilt action of the wedge. Herein the abutment is so designed—elongated on one side—, that it exactly or almost exactly balances the tilt moment caused by the wedge action.

In another preferred embodiment the wedge is guided on a guide block seated on the plate with its "L" guide element, which with respect to manufacturability is easier to achieve than to provide this guide element directly on the plate.

In yet another embodiment abutments or stops for limiting the float range of the wedge are provided on the glide blocks of the respective wedge lock pair, which limit the floating range in the unlocking direction. Thereby, in simple manner, a self-centering of the wedges of a wedge lock pair is achieved.

When, in an embodiment wherein the central axis of the spindle extends between the wedge surfaces of the clamp wedges of a wedge lock pair and are, perpendicular to the clamp bolt axis running, clamp plate fixed transverse guide surface, along which the clamp wedges of the wedge lock pair are slidable back and forth, the spindle axis runs between the wedge slant surface and the perpendicular to the bolt axis running guide surface of the wedge glide stone, it is achievable in simple manner, in combination with the "asymmetric" guiding of the wedge glide block, that the clamping process cannot result in a tilting or tipping of the wedge in the area of its slide surfaces, whereby also an easy opening—detensioning—of the wedge locks is ensured.

The type of floating mounting of the clamping bolts on the blow mold and the centering thereof by centering boreholes in the carrier plate when the clamp bolts are mounted floating in the radial direction on the mold tool and by the form fitting engagement with centering bore holes are therewith rigidly connected guide slope bring the clamp plate into the suitable position for clamping to the clamp plate accomplishes the advantage, that the T-groove shanks cannot widen and no amount of transverse force can be exercised upon the blow mold, since, by the form locking supporting of the bolts in the centering boreholes, a taking up of the radial transverse forces occurs solely by the plate. Thereby it is ensured that, during clamping of the wedge locks, no amount of forces act upon the mold halves which could lead to a displacement thereof relative to the clamping plate and/or to the complimentary mold half.

The design of the clamping device to the extent that the precentering of the bolts mounted floating on the blow mold occurs in a relatively wide or broad tolerant bore of the clamp plate and the fine centering occurs in a precise fine centering bore step, produces the advantage, that the blow mold—with utilization of the floating mounting of the bolts is easily seatable upon the clamp plate, since the precise positioning or orientation of the clamp bolts occurs substantially automatically. The provision of the fine centering bore on the guide block seated fixedly on the clamping plate is advantageous for manufacturing reasons.

When axially spring loaded bayonet mounts are provided for the radial floating mounting of the clamp bolts to their respective blow mold halves, the bolts are anchored on the mold tool by means of a spring biased bayonet lock or mount, which does not compromise the floating ability thereof, since the spring force acts only in the axial direction.

BRIEF DESCRIPTION OF THE DRAWINGS

Further details of the inventive clamping device can be seen from the following description of a preferred embodiment on the basis of the figures.

There is shown:

FIG. 1 a locking system of a blow mold machine provided with the inventive mold tool clamping device in schematic simplified side view, FIG. 2a the clamping device of the locking system according to FIG. 1 in the clamped condition, seen in the direction of the arrow II a of FIG. 1, in partial sectional, schematic simplified representation, FIG. 2b a view of a wedge lock of the clamping device according to FIGS. 1 and 2a, with a slide block as clamping element, which is guided slideable back and forth between the slit walls of a guide block, seen in the direction of the arrow II b of FIG. 1, FIG. 2c the slide block of the wedge lock according to FIG. 2b, seen in the direction of the arrow II c of FIG. 2b, FIG. 2d the slide block according to FIG. 2c, seen in the direction of the arrow II d of FIG. 2c, FIG. 2e a side view of a clamping bolt of the lock according to FIG. 2a, FIG. 2f a clamping bolt according to FIG. 2e in section along the line IIf—IIf in FIG. 2e, FIG. 3a a device for floating anchoring of a clamping bolt according to FIGS. 2e and 2f in a sectional representation corresponding to FIG. 2c, and FIG. 3b a view of a device according to FIG. 3a in the direction of the arrow IIIb of FIG. 3a.

DETAILED DESCRIPTION OF THE INVENTION

Figure 1:
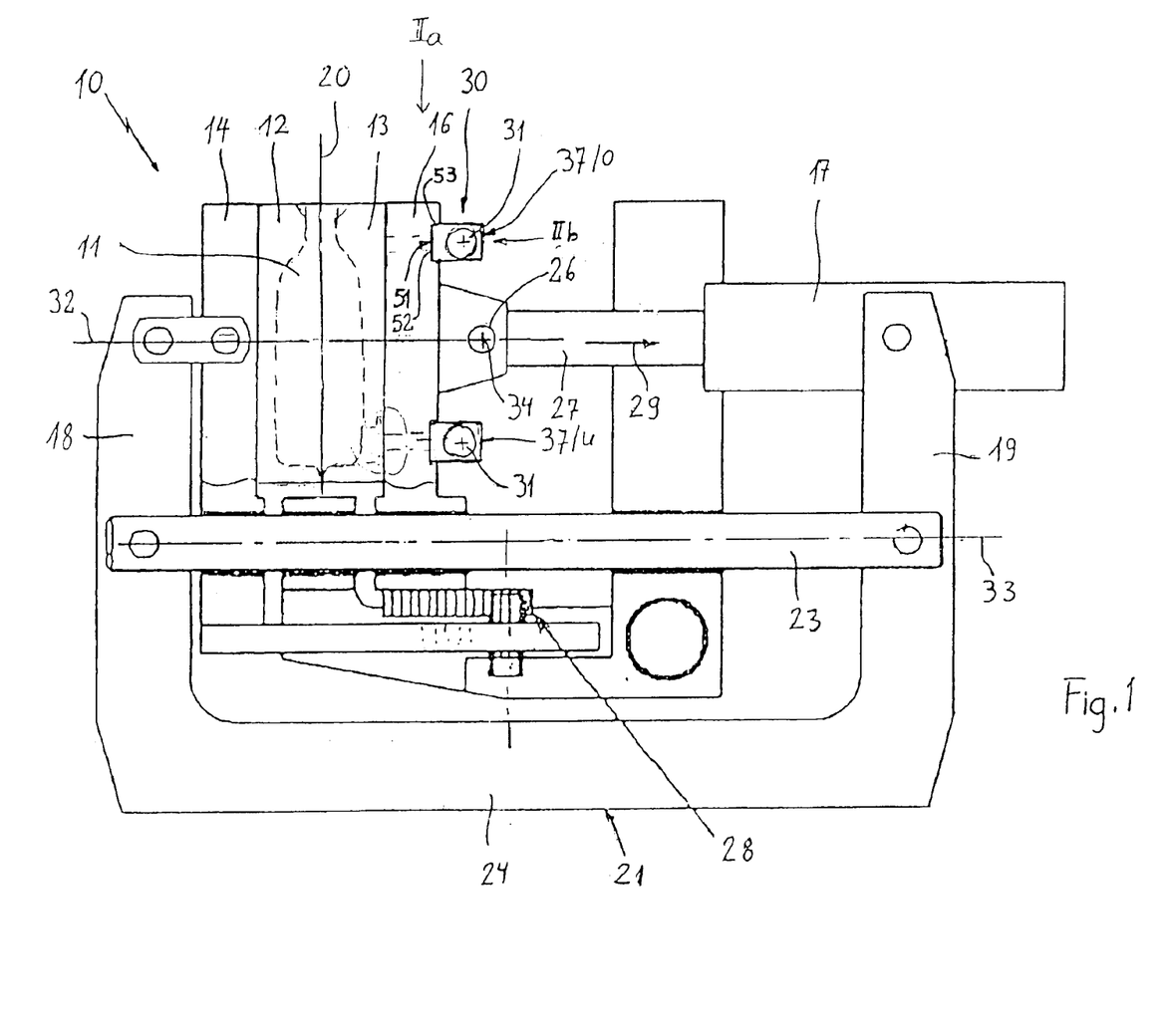

The locking system indicated overall with reference number 10 in FIG. 1 represents a blow mold machine with which for example bottle shaped mold hollow bodies 11 can be blown. The blow mold provided therefore includes two mold halves—mold tools 12 and 13—, which are respectively secured to one clamping plate 14 or as the case may be 16. They can be pushed into the represented closed configuration of the blow mold by control of a hydraulic cylinder 17 of the lock system 10, wherein the two mold tools 12 and 13 lie against each other along a vertical longitudinal central plane 20, which is the common longitudinal central plane of a—not shown—blow station and a—likewise not shown—extrusion station of the blow mold machine, between which the blow mold carrying locking system 10 for receiving extruded tube shaped plastic pre-forms, as well as, and for blowing the mold hollow bodies back and forth is moveable.

The mold tool 12 and 13 carrying clamp plates 14 and 16 are provided between vertical upward projecting shanks 18, 19 of a basically C-shaped, upwardly open and overall with reference number 21 indicated frame of the closing system 10. The frame 21 is shaped symmetric with reference to the vertical transverse central plane 22 (FIG. 2a) of the closing system running at right angles to the vertical longitudinal central plane 20 of the blow mold and includes two "horizontal" guide spars or beams 23, which extend approximately in the central height between the "horizontal" yoke or crib shank 24 of the frame 21 and the free end of its outer vertical shank 18 or as the case may be its inner vertical shank 19 and connects these with each other on both sides of the vertical cross sectional central plane 22.

The rear clamp plate 16 provided facing the hydraulic cylinder 17 is connected fixed against pulling and pushing with the piston rod 27 of the hydraulic cylinder via a linkage 26 provided on its back side. The back clamp plate 16 is guided slideable back and forth "horizontally" on the guide beams or spars 23.

The front clamp plate 14 and the rear clamp plate 16 are kinetically coupled with each other in known manner by means of a synchromesh gear or synchronized gear indicated overall with reference number 28, in such a manner, that, beginning with the represented closed configuration of the blow mold, during an opening stroke of the piston rod 24 in the direction of the arrow 29 in FIG. 1, for both mold tools 12 and 13 there results in response a corresponding opening stroke by which the each other facing surfaces of the mold tool 12 and 13 become distant from the "machine fixed" longintudinal central axis 20 of the lock system 10.

Also the front clamp plate 14, which is provided on the side of the longitudinal central plane 20 opposite to the drive cylinder 17, is guided slideably upon the guide beams or spars 23, this however only for the purpose of being able to equalize or balance bending dependent separation—enlargements, which the free upper ends of the upward facing shanks 18 and 19 of the frame 21 experience, when the hydraulic cylinder 17 exercises a high closure force upon the closure system 10.

For the releasable fixing of the rear blow mold half 13 on the rear clamp plate 16 which carries it there is provided a mold tool clamping device indicated overall with reference number 30, which is provided on the rear side of the clamp plate 16 facing the hydraulic cylinder 17 and is operable by means of operating elements 31, positioned on the side, for the tight clamping of the rear mold half 13 to the clamp plate 16 as well as for releasing the mold half 13 from the clamp plate 16.

This operating or actuating element 31 can be seen in FIG. 1 as rotation knobs projecting out from the side beyond the rear side of the clamp plate 16, which are operable by hand "from outside".

For a more detailed explanation of the clamping device 30 reference if now made to FIGS. 2a through 2f:

The clamping device 30 in the special embodiment selected for explanatory purposes, apart from the side orientation of their operating elements 31, is designed symmetric as well with respect to the vertical longtudinal central plane 20 of the closure system as also with respect to the horizontal transverse central plane 22, which runs parallel to the horizontal plane which is defined by the central axes 33 of the guide spars 23 and contains the thereto parallel linkage axis 34 of the linkage 26, via which the piston rod 27 of the hydraulic cylinder 17 is coupled with the rear clamp plate fixed against pulling and pushing.

The clamping device 30 includes four wedge locks 36, via the tension operation of which the rear mold tool 13 can be applied to its clamp plate 16, of which respectively two are assembled to a wedge lock pair 37/o and 37/u, of which respectively one common linear drive device 38 is associated, through the manually or mechanically controlled operation of which both wedge locks 36/1 and 36/r of the respective wedge lock pair 37/o or as the case may be 37/u are together tensionable and releasable.

Figure 2A:
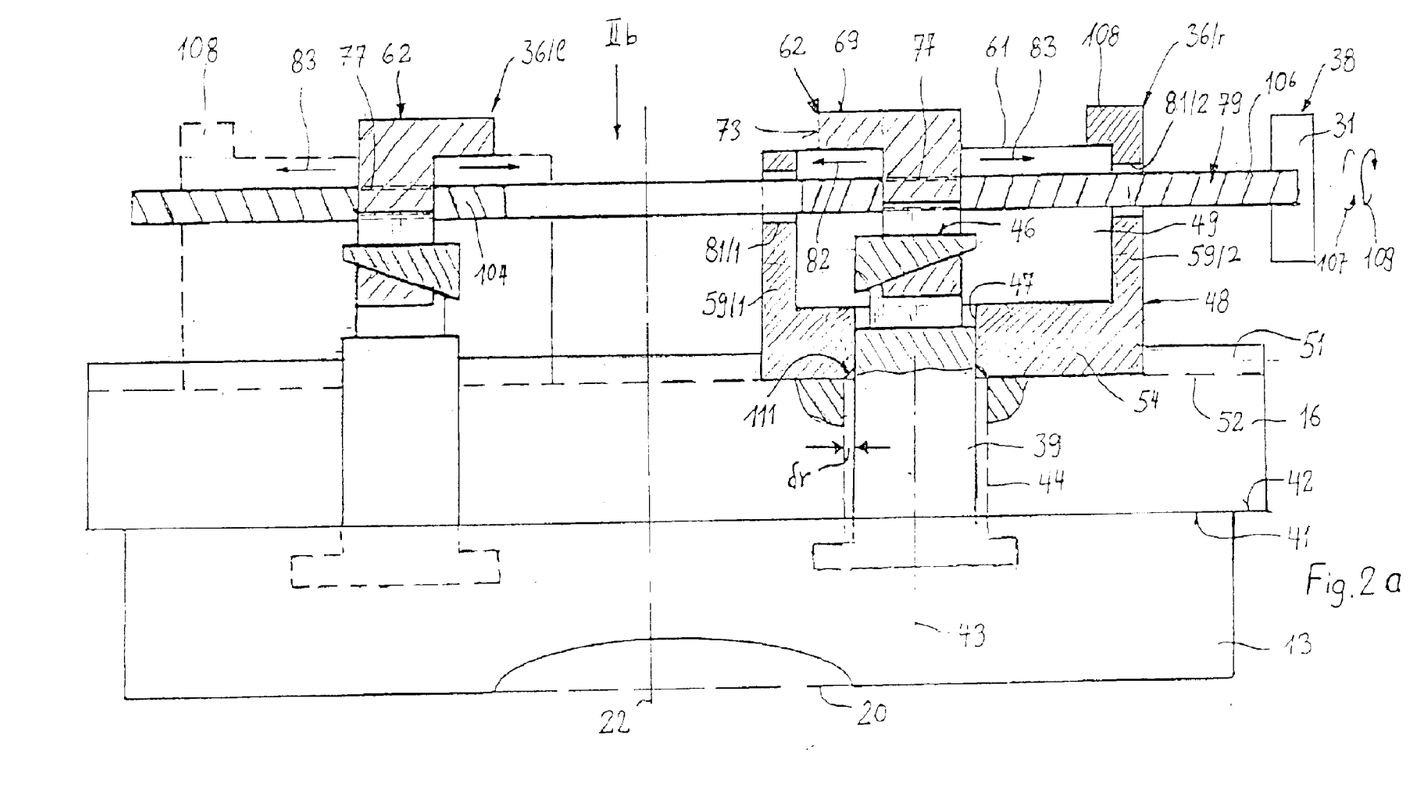

The wedge locks 36/1 and 36/r are designed or formed symmetric relative to the vertical transverse central plane 22 of the closure system 10 or as the case may be the rear clamp plate 16, so that for explaining the construction of the wedge locks it is sufficient to explain this construction with reference to only one of them, which shall be the right wedge lock 36/r on the basis of FIG. 2, which according to the representation of FIG. 1 belongs to the upper part lock pair 37/o, of which the clamp locks 36/1 and 36/r represent that configuration in FIG. 2a, which corresponds to the tightly clamped condition of the rear mold half on the clamp plate 16.

The wedge lock 36/r includes, in the arrangement according to FIG. 2, a basically cylindrical clamp bolt 39, which is anchored fixed against pulling in the rear mold half 13 with the orientation of its central longitudinal axis 43 extending perpendicular to the planar outer surface 41 of the inner mold half 13, with which this lies against the planar outer surface 42 of the rear clamp plate 16. The—cylindrical— clamp bolt 39 extends through or traverses with its central longitudinal axis 43 an axial bore 44 of the rear clamp plate 16, of which the diameter is slightly larger than the diameter d of the clamp bolt 39.

The clamp bolt 39 is extending through a central borehole 47 of a guide block indicated overall with the reference number 48, which guide block 48 is fixed to the rear side of the rear clamp plate 16, said clamp bolt 39 projecting with an anchoring segment indicated overall with reference number 46 (FIG. 2d), into an otherwise longitudinal hole-shaped designed internal space 49 of the guide block 48, which from the outside has the basic shape of a quadrilateral, which is seated fixedly in a flat or surface groove 51 provided on the back side of the rear clamp plate 16, of which the groove floor 52 extends parallel to the vertical longitudinal central plane 20 and of which the groove walls 53 run parallel to the horizontal transverse central plane 32 of the closing system.

By means of not shown screws, which pass through the thick walled base area 54 of the guide block 48, this guide block 48 is rigidly but releasably anchored to the rear clamp plate 16.

The guide block 48 is designed to be symmetric with respect to its "horizontal" longitudinal central plane 56, which runs parallel to the horizontal transverse central plane 32 of the closing system 10.

The outwardly open internal space 49 of the guide block 48 is designed slit-shaped on both sides of the centering bore 47 wherein the two internal surfaces 57/1 and 57/2 of the longitudinal walls 58/1 and 58/2 of the guide block 48 which extend between stable transverse walls 59/1 and 59/2 of the guide block 48, are arranged lying opposite to each other, and running parallel to the longitudinal central plane 56 of the guide block, thereby forming longitudinal guide surfaces and wherein the co-planar free end surfaces 61 of the longitudinal walls 58/1 and 58/2 of the guide block 48 the common plane of which coplanar surfaces 61 run parallel to the longitudinal central plane 20 of the closing system, form support surfaces for an overall with 62 indicated glide stone, which forms the clamp element, which by the sliding relative to the anchoring segment 46 of the clamp bolt 32 of the wedge lock 36/r is tensionable—lockable—or, as the case may be, releasable.

Figure 2B:
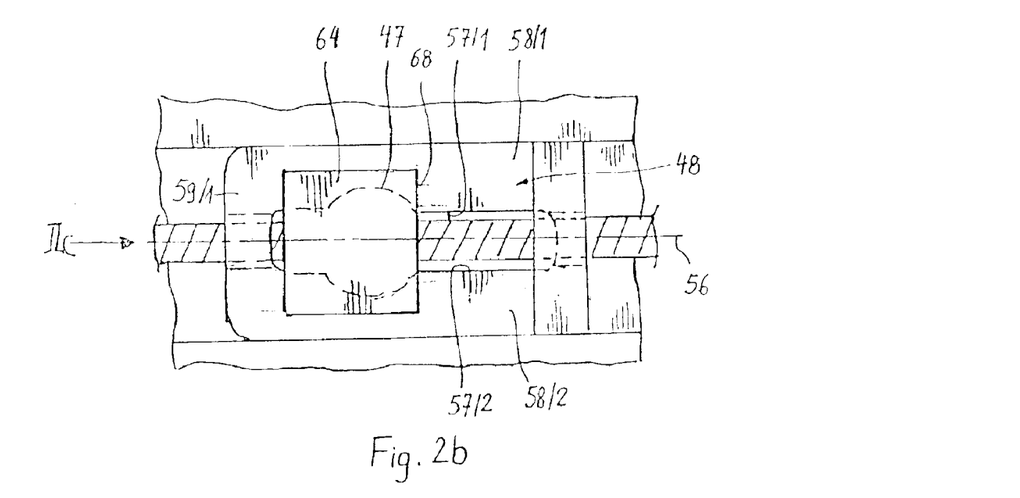
Figure 2C:
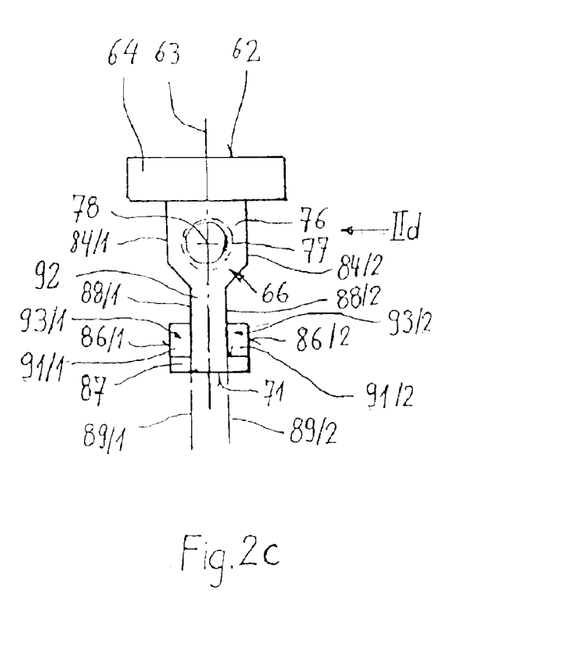
Figure 2D:
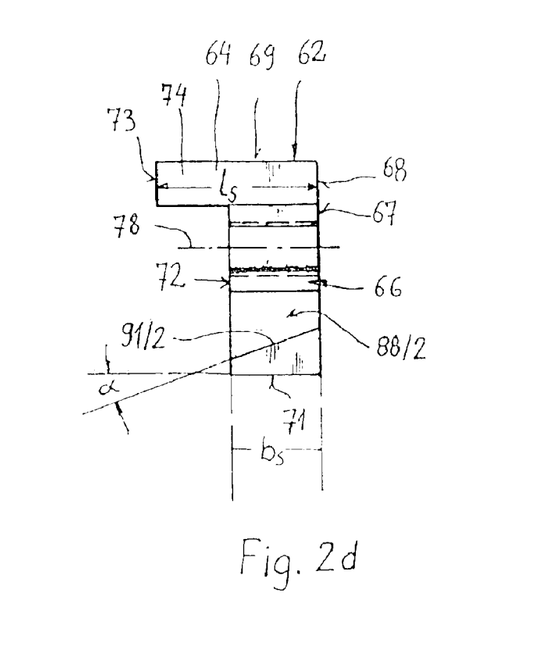

As shown in the detailed representation of FIG. 2c, the glide stone 62 is designed symmetric relative to its longitudinal central plane 63 which in the "closed" configuration of the wedge lock 36/r illustrated in FIGS. 2a and 2b coincides with the longitudinal central plane of the guide block 48. The glide stone 62 includes a support plate 64 of square or quadrilateral basic shape and a clamp shank 66, having a base shape of a flat bar, projecting from the support plate 64 at a right angle "downwards". The clamp shank joins with its one "outer" narrow end surface 67 (FIG. 2d) flat against the one, outer transverse bordering surface 68 of the support plate 64 of the glide stone 62 and ends with a free, rectangular end surface 71 parallel to the free outer surface 61 of the support plate 64. The breadth $b_s$ measured between the outer narrow end surface 67 of the clamp shank 66 and its inner narrow end surface 72 is significantly smaller than the extension "length" $l_s$ measured between the outer boundary surface 68 and the oppositely lying "inner" boundary surface 73 of the support plate—of the same, so that the support plate 64 has a "free support segment" 74 projecting on one side beyond the shank 66.

In a base area 76 immediately adjacent the support plate 64 the glide stone 62 has a threaded bore 77, of which the central axis 78, seen in the closed condition of the wedge lock 36/r intersects the central longitudinal axis 43 of the clamp bolt 39 perpendicularly and runs in the longitudinal central plane 56 of the guide block 48.

A threaded spindle 79 is in engagement with the threaded bore 77 which extends through each other aligned bores 81/1 and 81/2 of the transverse walls 59/1 and 59/2 of the guide block 48. By rotating the threaded spindle 79 by means of the actuating element 31 in alternative directions of rotation—clockwise and counterclockwise—the glide stone 62 is displaceable in the opposing directions represented by the arrows 82 and 83, wherein the glide stone 62 is slidably guided by means of the longitudinal guide surfaces 84/1 and 84/2 of its base area 76 as well as the herewith respective coplanar longitudinal guide surfaces 86/1 and 86/2 of its free end segment 87 between the each other oppositely running internal surfaces 57/1 and 57/2 of the longitudinal walls 58/1 and 58/2 of the guide block 48. Between the base area 76 and the free end segment 87 of the clamp shank 66 of the glide stone 63 there are machined-in respectively external open "wedge"—grooves, of which the groove base respectively runs in the plane 89/1 or as the case may be 89/2 parallel to the glide guide surfaces 84/1 and 86/1 or as the case may be 84/2 and 86/2.

The planar walls 91/1 and 91/2 of the wedge grooves 88/1 and 88/2 adjacent to the free end surfaces 71 of the clamp shank—end segment 87 join at right angles respectively to the groove base surfaces 89/1 and 89/2 and extend, seen in the configuration of the wedge lock 36/r according to FIG. 2a between the narrow inner end surface 72 of the clamp shank 66 and its narrower outer end surface 67 diagonally increasing in such a manner that these groove walls 91/1 and 91/2 join with the free surface 71 of the clamp shank 66 at a wedge angle α of approximately 20°, so that the free end segment 87/1 forms on both sides of the bar 92 connecting the base portion 76 with the free end segment 87 two clamp wedges 93/1 and 93/2, by driving of which into complementary designed anchor slits or grooves 94/1 and 94/2 (FIG. 2e) of the clamp bolts 39 the wedge lock 36/r is tensionable.

Figure 2E:
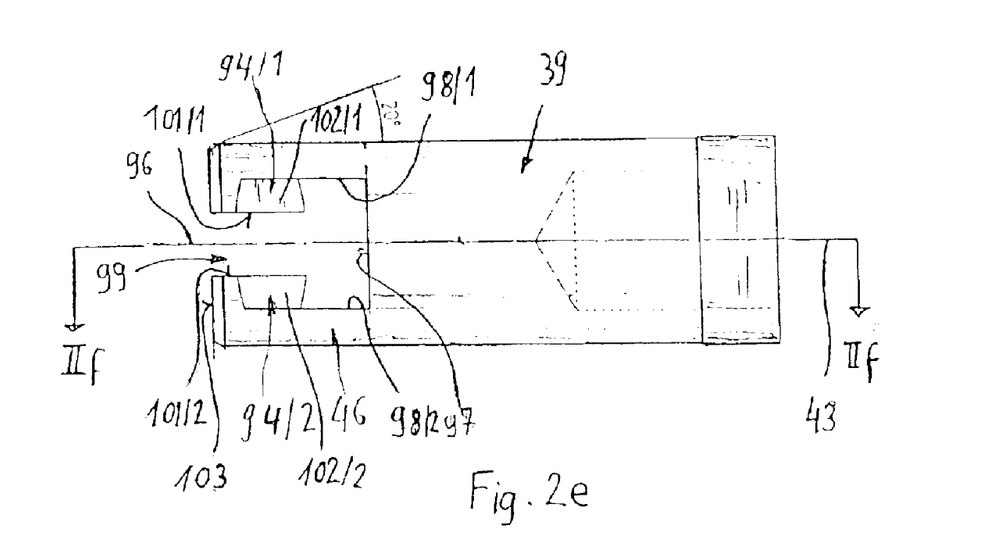
Figure 2F:
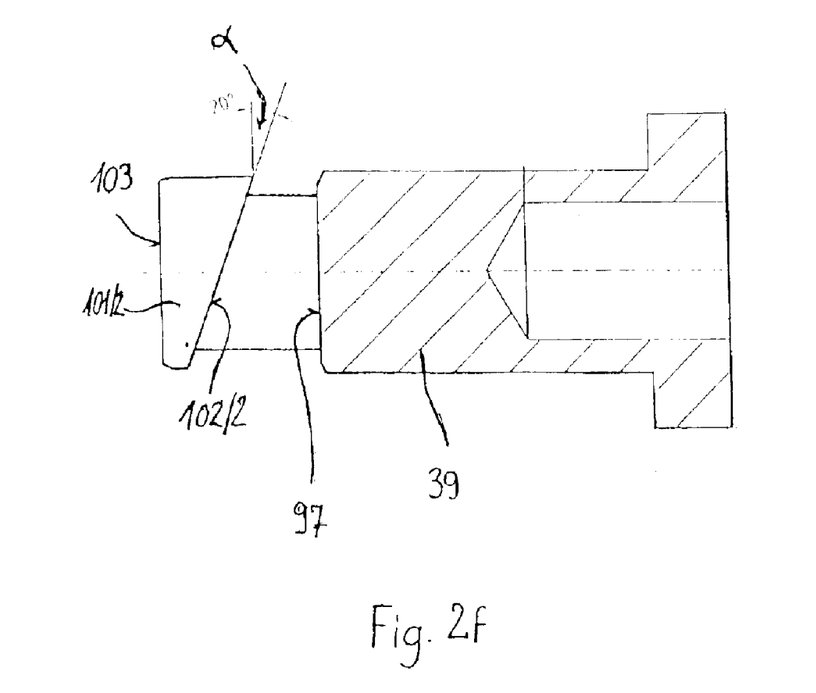

The clamp 39 is formed, in accordance with the detailed representation of FIG. 2e, symmetric relative to its "longitudinal"—central plane 96 which contains the central longitudinal axis 43 of the clamp bolt 39, and which in the closed condition of the wedge lock 36/r coincides or overlaps with the longitudinal central plane 63 of the glide stone 62.

The two anchor grooves 94/1 and 94/2 provided similarly in the inside of the anchoring segment 46 of the clamping bolt 39 have as a "common" inner groove wall an inner end surface 97 running at a right angle to the longitudinal central plane 96, and extending between planar parallel to each other running groove base surfaces 98/1 and 98/2. The separation of these groove base surfaces 98/1 and 98/2 from each other is slightly larger than the distance of the longitudinal guide surfaces 84/1 and 84/2 of the base area 76 of the glide stone 62, so that sufficient guide play is present, in order to be able to introduce the glide stone 62 with its clamp wedge 93/1 and 93/2 easily into the anchor groove 94/1 and 94/2 of the clamp bolt 39.

These anchor grooves 94/1 and 94/2 of the clamp bolt 39 are set off from each other by a transverse slit 99, of which—planar—slit walls 101/1 and 101/2 have a separation from each other, which is somewhat larger than the thickness of the bar 92, which connects the base segment 76 of the glide stone 62 with the free end segment 87 of the clamp shank 66 forming the wedge 99/1 and 99/2, but is significantly smaller than the separation of the longitudinal guide surfaces 86/1 and 86/2 of the wedge forming end segment 87 of the clamp shank 66 of the glide stone 62, such that a sufficiently large surface overlapping of the clamp wedge surfaces 93/1 and 93/2 with the outer groove wall surfaces 102/1 and 102/2 of the clamp bolt 39 results, which likewise describe with the outer end surface 103 of the clamp bolt 93 (FIG. 2f) an angle α of approximately 20°.

The wedge lock 36/l shown in the left part of FIG. 2a is constructionally the same as the wedge lock 36/r shown on the right part of FIG. 2. It differs with respect to its arrangement essentially therein, that it is rotated by 180°— "mirror image" with respect to the vertical transverse central plane 22. In the illustrative embodiment selected for explanation the threaded bore 77 of the glide stone 62 is in threaded engagement with a right threaded—segment 104 of the threaded spindle 79, while the thread bore 77 of the glide stone 62 of the "right" wedge lock 36/r is in threaded engagement with a left threaded—segment 106 of the threaded spindle 79.

By the rotation of the threaded spindle 79 via the rotation knob 39 in the counterclockwise direction represented by the directional arrow 107, the glide stones 62 of both wedge locks 36/l and 36/r experience therewith a displacement in the direction of the arrows 83, that is, away from each other, that is, in the sense of an opening of the wedge locks 36/l and 36/r.

These opening displacement movement of the glide stones 62 are limited by stops 108, which are so arranged on the outer transverse walls 59/2, that in the abutment limiting end position the rear mold half 13 can be easily removed without difficulty from the engagement position of its clamp bolts 39 with the centering bores 47 of the guide blocks 48 and the somewhat wider or broader transverse bores 44 of the rear clamp plate 16.

On the other hand, when the threaded spindle 79 is rotated in the clockwise sense represented by the rotation arrow 109, the glide stones 62 of both wedge locks 36/l and 36/r experience a towards each other directed displacement in the direction of the arrow 82, which leads to the represented clamp position, in which the "slanted" wedge surfaces 91/1 and 91/2 of the clamp wedge 93/1 and 93/2 of the glide stones 62 with a, through the actuating force settable surface pressing, likewise lie against the diagonal counter-surface 101/1 and 101/2 of the clamp bolts.

The wedge angle α is selected to be slightly larger than the value $α_s$ below which for a preselected pairing of the materials of which the clamp bolts 39 and the glide stones 62 are made, a self jamming fixing of the wedge locks 36/l and 36/r in the represented clamp position would be possible. In order at the same time to achieve a "self-jamming" fixing of the wedge locks 36/l and 36/r in the clamp position, the mutually engaging threads of the glide stones 62 and of the "counter-sense" threaded segments 104 and 106 are formed to be self-jamming.

By the design of the support plate 64 of the glide stone 62 with each other facing support plate projections 74 as well as the arrangement of the threaded spindle 79 between the clamp elements and the support plates 64 of the wedge stones, tilt movements which otherwise—during the clamping operation—could act upon the glide stones 62, can be substantially compensated for or corrected or as the case may be balanced out, so that insofar no significant transverse forces are transmitted to the rear mold half 13, which could lead to a misalignment between this and the rear clamp plate 16 and/or to a misalignment between the mold halves 12 and 13.

The purpose of a substantial avoidance of such transverse forces or diagonal forces is also served by a "floating" anchoring of the clamp bolts 39 on the rear mold half 13, in such a manner, that the clamp bolts 39 in the radial direction, that is, in all conceivable directions perpendicular to the central longitudinal axis 43 have sufficient play for deviating in their anchoring, when the respective clamp bolt 39 is introduced in the fine centering bore 47 of the respective guide block 48, wherein this centering bore 47 widens with a diagonal inlet chamfer 111 to the diameter of the transverse bore 44 of the rear clamp plate 16 which is larger by the amount δ d (FIG. 2a).

Figure 3A:
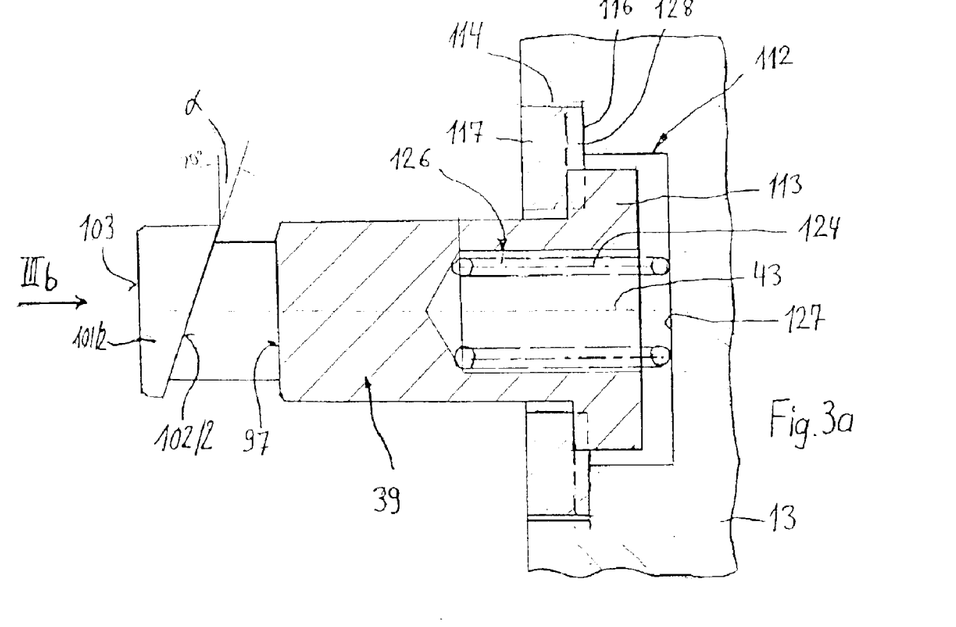
Figure 3B:
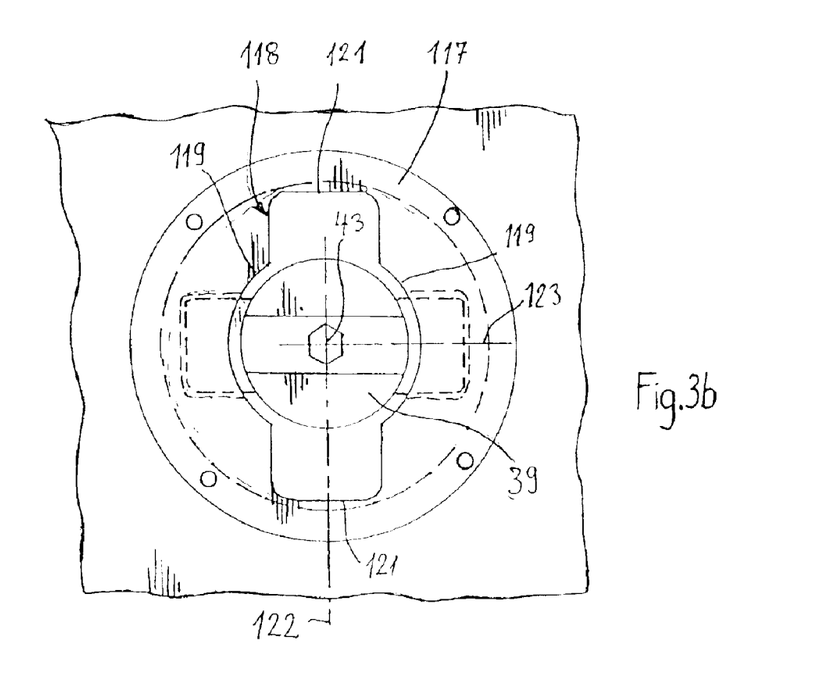

For explaining this floating anchoring now reference is made to FIGS. 3a and 3b. In accordance therewith the clamp bolt 39 is respectively received in a cylindrical-pot shaped recess 112 in the rear mold half, of which the diameter is somewhat larger than the length of a basically right angled burr 113, which beginning from the anchoring end of the clamp bolt 39 extends flange shaped at a right angle therefrom.

The pot-shaped recess 112 has a circular round widening 114, which is set off from the recess 112 by a ring shoulder 116. In this widening 114 an anchoring ring 117 is seated or introduced and in the area of the ring shoulder 16 is screwed tight to the mold half 13. The anchoring ring 117 has an inlet opening indicated overall with reference number 118 and having a contour which can be seen from FIG. 3b. This inlet opening is bordered circular round on other oppositely lying sector regions 119, wherein the radius of this circular round edged opening area 119 is somewhat larger than the radius of the clamp bolt 39. The opening sections 119 of circular shaped contour, the inlet opening 118 has substantially U-shaped recesses 121, of which the middle plane 122 runs at a right angle to the middle plane 123 of the circular round edged region 119. By the overall slit shaped inlet opening 118 the clamp bolt 39 can be introduced with its flange or burr 113 in the recess 112 of the rear mold half 13. This introduction occurs against the return spring force of a return spring 124, which is received in a central blind bore 126 of the clamp bolt 39 and basically supports itself on the base 127 of the recess 112.

By rotating the clamp bolt about 90°, while the return spring is somewhat compressed, the flange or burr 113 can be brought into a position in which it can engage with mutually aligned "radial" inner groove 128 of the anchoring ring 117 and is held in this detent position by the pretensioned return spring 124. The grooves 128 also have sufficient play, such that the floating anchoring of the clamp bolt 39 is ensured, which as a result provides for a decoupling of the clamp bolt engaging draw and tension forces and the transverse forces, respectively.

This type of anchoring corresponds to that of a spring loaded bayonet mount restrained with radial play.

What is claimed is:

1. Mold tool clamping device for blow mold machines, in which a blow mold comprising two mold halves or mold tools, which can be pushed together via a closure driver or actuator, in such a manner, that in the closed configuration of the blow mold they lie directly against each other along a central plane and are again separable from each other "symmetric to this central plane", wherein an electric or hydraulic linear actuator is provided as the closure actuator, which engages on the "back" side of the clamp plate (16) facing the actuator and the further aggregates of the machine carrying machine frame, which clamp plate (16) is synchronized via a synchronization drive with the "front" clamp plate (14) on which the "front" mold tool is clamped, the synchronization being such that both mold halves are displaceable by a defined stroke relative to the blow mold central plane, and wherein for fixing the mold halves (12, 13) on their clamp plates (14 or 16) these are provided with clamping bolts traversing these and connected resistant against pulling with the mold halves, which have anchoring end segments projecting or exiting from the clamp plates, which are engaged by the clamp elements, which respectively maintain the mold halves releasably fixed to the clamp plates which carry them, wherein a) for securing the back blow mold half (13) to the clamp plate (16) which carries it, at least two wedge locks or cam locks are provided in a symmetric arrangement relative to the "vertical" central plane of the blow mold perpendicular to the plane of separation of the mold halves (12, 12), which wedge locks can be tensioned b) by driving of clamp wedges, which are supported on planar surfaces on the back side of the clamp plate, into anchor grooves or keyways of the clamp bolts running perpendicular to the longitudinal axis of the clamp bolts, which have external slide surfaces running at the wedge angle of the clamp wedges relative to the outer clamp plate plane, with which slide surfaces the wedge surfaces oblique with respect to the clamp plates come into supporting contact when the wedges are driven into the anchor groves, such that the driving together of the wedge surfaces running diagonally to the clamp plates results in tensioning, wherein c) for tensioning and releasing the wedge locks a manual or motor driven linear actuator is provided, which sets the fixing of the tensioning wedges by self jamming.

2. Mold tool clamping device according to claim 1, wherein a wedge lock pair, which is used for clamping the respective mold halves, in particular the rear mold half, to the associated clamp plate, is substantially symmetric relative to the transverse center plane of the blow mold, and is operable from one side.

3. Mold tool clamping device according to claim 1, wherein as a linear actuator for the displacement of the tensioning wedges of a wedge lock pair, a manual or motor driven spindle drive is provided, of which the rotationally actuatable threaded spindle has counter rotating threaded segments, which are in threaded engagement with appropriately counter rotating threads provided in glide stones rigidly connected with the wedges of the wedge blocks, which guide stones are mounted slidably relative to the clamp plates or in guide elements rigidly connected to the clamp plates.

4. Mold tool clamping device according to claim 1, wherein the spindle threads are self jamming, the wedge angle of the wedges however is greater than that value which would result in self jamming.

5. Mold tool clamping device according to claim 1, wherein the anchor slit of the clamping bolts are in the form of a T-groove open on one side towards the free end thereof, of which support surfaces for the wedges, running diagonally to the wedges, are defined by transverse slit regions of the T-groove slit walls provided on both sides of a central groove slit "above" and "below" the edge-open central groove slit, and that the clamp wedges are connected with the guide shanks via guide segment extending through the central groove slit, which extend perpendicularly to the central bolt axes and are supported in an outer guide surface extending parallel to the wedge direction of sliding and fixed to the plate, wherein these guide shanks are provided to lie opposite the slanted groove flanks and extend L-shaped perpendicular to the central longitudinal axis of the clamp bolts.

6. Mold tool clamping device according to claim 5, wherein the guide surfaces fixed to the clamp plates, against which the guide shanks of the guide wedges are supportable, are provided on the guide blocks seated rigidly on the clamping plates.

7. Mold tool clamping device according to claim 1, wherein abutments or end stops are provided for limiting the range of float of the clamp wedge, which limit the floating movement in the unlocking direction.

8. Mold tool clamping device according to claim 3, wherein the central axis of the spindle extends between the wedge surfaces of the clamp wedges of a wedge lock pair and are, perpendicular to the clamp bolt axis running, clamp plate fixed transverse guide surface, along which the clamp wedges of the wedge lock pair are slidable back and forth.

9. Mold tool clamping device according to claim 1, wherein the clamp bolts are mounted floating in the radial direction on the mold tool and by the form fitting engagement with centering bore holes are therewith rigidly connected guide slope bring the clamp plate into the suitable position for clamping to the clamp plate.

10. Mold tool clamping device according to claim 9, wherein a pre-centering of the—radially—floating clamp bolts on the blow mold occurs via a relatively broadly tolerant bore step of the clamp plate, which transitions via a conical intermediate area to a fine centering step, of which the diameter corresponds to that of the clamp bolt diameter.

11. Mold tool clamping device according to claim 9, wherein the fine centering bore step is provided on a guide block rigidly connected to the clamp plate.

12. Mold tool clamping device according to claim 9, wherein axially spring loaded bayonet mounts are provided for the radial floating mounting of the clamp bolts to their respective blow mold halves.

* * * * *